United States Patent
Ogiso

(10) Patent No.: US 12,298,735 B2
(45) Date of Patent: May 13, 2025

(54) MACHINING TIME PREDICTION DEVICE AND MACHINING TIME PREDICTION METHOD

(71) Applicant: FANUC CORPORATION, Yamanashi (JP)

(72) Inventor: Tarou Ogiso, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/724,408

(22) PCT Filed: Feb. 18, 2022

(86) PCT No.: PCT/JP2022/006693
§ 371 (c)(1),
(2) Date: Jun. 26, 2024

(87) PCT Pub. No.: WO2023/157244
PCT Pub. Date: Aug. 24, 2023

(65) Prior Publication Data
US 2025/0068141 A1    Feb. 27, 2025

(51) Int. Cl.
*G05B 19/406* (2006.01)
*G05B 19/4069* (2006.01)
*G05B 19/414* (2006.01)

(52) U.S. Cl.
CPC ..... *G05B 19/4069* (2013.01); *G05B 19/4145* (2013.01); *G05B 2219/33099* (2013.01); *G05B 2219/37336* (2013.01)

(58) Field of Classification Search
USPC .......................................................... 700/184
See application file for complete search history.

(56) References Cited

U.S. PATENT DOCUMENTS

| | | | |
|---|---|---|---|
| 2003/0139825 A1* | 7/2003 | Lund | G05B 5/01 700/19 |
| 2013/0173026 A1* | 7/2013 | Kawana | G05B 5/01 700/30 |
| 2020/0382037 A1* | 12/2020 | Ogiso | H02P 3/00 |

FOREIGN PATENT DOCUMENTS

| | | |
|---|---|---|
| JP | 2004-126956 | 4/2004 |
| JP | 2007-11680 | 1/2007 |

(Continued)

OTHER PUBLICATIONS

JP_2012243152_A (Year: 2012).*

(Continued)

*Primary Examiner* — Hien D Khuu
(74) *Attorney, Agent, or Firm* — Wenderoth, Lind & Ponack, L.L.P.

(57) ABSTRACT

A machining time prediction device for a machine tool that controls at least one axis to machine a workpiece on the basis of a machining program, the machining time prediction device comprising: an analysis unit that analyzes the machining program and generates operation instructions for the axis; an execution control unit that supervises the execution of operation instructions, instructs the operation of the axis on the basis of the result of analyzing the machining program and determines that the operation of the axis is complete; an axis control unit that generates control commands on the basis of the axis operation instructions; a machining time prediction unit that measures the time required to execute the machining program and predicts the machining time; and an axis operation simulation unit that simulates the operation of the axis on the basis of the control commands and outputs virtual responses.

8 Claims, 14 Drawing Sheets

(56) References Cited

FOREIGN PATENT DOCUMENTS

| | | |
|---|---|---|
| JP | 2007-25945 | 2/2007 |
| JP | 2009-98981 | 5/2009 |
| JP | 2012-243152 | 12/2012 |
| JP | 2014-219911 | 11/2014 |
| JP | 2017-207823 | 11/2017 |
| JP | 2019-61523 | 4/2019 |
| JP | 2020-107315 | 7/2020 |

OTHER PUBLICATIONS

JP_7014062_B2 (Year: 2022).*
International Search Report issued Apr. 26, 2022 in corresponding International Application No. PCT/JP2022/006693.

* cited by examiner

MACHINING TIME PREDICTION DEVICE AND MACHINING TIME PREDICTION METHOD

TECHNICAL FIELD

The present disclosure relates to a machining time predicting apparatus and a machining time predicting method for a machine tool. The present disclosure particularly relates to a machining time predicting apparatus for predicting, based on a machining program, a machining time for a machine tool to machine a workpiece by controlling at least one axis, and a machining time predicting method.

BACKGROUND ART

In order to efficiently perform machining, it is necessary to grasp the time required for each process before machining. In particular, it is important to grasp the time required to execute the machining program of the CNC machine tool.

Patent Document 1 describes a numerical control apparatus that obtains the shortest predicted machining time within an allowable machining error. Specifically, Patent Document 1 describes specifying speed data that provides a machining speed for machining a workpiece and accuracy data that provides machining accuracy, that a program analysis unit creates interpolation data for a machining program, that an interpolation unit creates interpolation data (ΔPn) by performing interpolation according to the interpolation data based on the speed calculated by a pre-interpolation acceleration/deceleration unit, and that a post-interpolation acceleration/deceleration unit creates servo position command data (VCn) by performing post-interpolation acceleration/deceleration on the interpolation data (ΔPn). Patent Document 1 further describes that a servo simulation unit receives the servo position command data (VCn) and generates servo position data (Qn) in which actual servo operation has been simulated, and that a machining time predicting unit can measure a machining time by using the interpolation data or counting the number of interpolations, and that a machining error predicting unit uses the interpolation data (ΔPn) and the servo position data (Qn) to calculate a predicted machining error.

Patent Document 2 describes a numerical control apparatus that enables prediction of a machining time with high accuracy in consideration of a machine delay occurring in a machine. Specifically, Patent Document 2 describes that the numerical control apparatus comprises a reference machining time predicting unit for predicting a reference machining time corresponding to a machining time not considering acceleration/deceleration of the axis based on the machining program, an acceleration/deceleration frequency predicting unit for predicting the number of times of acceleration/deceleration of the axis in the machining based on the machining program, a data storage unit for storing information related to a deviation time corresponding to a difference between an actual machining time corresponding to a machining time required for actual machining by the machine and the reference machining time predicted in the machining, a correction time calculation unit for calculating a correction time for correcting the reference machining time based on the number of times of acceleration/deceleration predicted by the acceleration/deceleration frequency predicting unit and the information related to the deviation time stored in the data storage unit, and a machining time predicting unit for calculating a predicted machining time obtained by correcting the reference machining time using the correction time.

Patent Document 3 describes a machining time calculation apparatus capable of accurately calculating a machining time before machining. Specifically, Patent Document 3 describes that a segmented path calculating means obtains a segmented path by dividing a designated tool path into segments such that portions of the designated tool path with a small curvature are divided at larger intervals and portions of the designated tool path with a large curvature are divided at smaller intervals, and that an axis control data calculation means moves a tool over each segmented path at a speed according to a designated tool movement speed to obtain, as axis control data A, a time change in an arbitrary position on the segmented path when the workpiece is machined and the tool movement speed in each axis direction obtained at predetermined time intervals. Patent Document 3 further describes that a machining time calculation means calculates a machining time for machining a designated range.

CITATION LIST

Patent Document

Patent Document 1: Japanese Unexamined Patent Application, Publication No. 2012-243152
Patent Document 2: Japanese Unexamined Patent Application, Publication No. 2017-207823
Patent Document 3: Japanese Unexamined Patent Application, Publication No. 2009-098981

DISCLOSURE OF THE INVENTION

Problems to be Solved by the Invention

It is difficult to predict an accurate machining time when a stop command for an axis is frequently described in a machining program of a CNC machine tool, or when an axis with a high inertia (a large response time constant) is mounted on a machine tool. Further, using actual machining data to predict a machining time requires time and labor for collecting the data. Therefore, there is a demand for a machine tool machining time predicting apparatus capable of predicting, without using actual machining data, an accurate machining time even when a stop command for an axis is frequently described in a machining program or even when an axis with a high inertia is mounted on a machine tool.

Means for Solving the Problems

A first aspect that is representative of the present disclosure is a machining time predicting apparatus that predicts, based on a machining program, a machining time for a machine tool to machine a workpiece by controlling at least one axis. The machining time predicting apparatus includes: an analysis unit that analyzes the machining program to generate an operation command for the axis; an execution control unit including an interpolation unit that manages execution of the operation command and to command an operation of the axis based on a result of analyzing the machining program, and an operation completion determination unit that determines that the operation of the axis has been completed; an axis control unit that generates a control command based on the operation command for the axis from the interpolation unit; a machining time predicting unit that predicts the machining time by measuring a time required for execution of the machining program; and an axis operation simulation unit that simulates, based on the control command, the operation of the axis and to output virtual responses. The operation completion determination unit is that determines, based on the virtual responses, that the operation of the axis is complete.

A second aspect that is representative of the present disclosure is a machining time predicting method performed by a computer serving as a machining time predicting apparatus that predicts, based on a machining program, a machining time for a machine tool to machine a workpiece by controlling at least one axis. The method comprises executing: a process of analyzing the machining program to generate an operation command of the axis; a process of managing execution of the operation command, commanding the operation of the at least one axis based on a result of analyzing the machining program, and determining that the operation of the axis has been completed; a process of generating a control command based on the operation command for the axis; a process of predicting the machining time by measuring a time required for execution of the machining program; and an axis operation simulation process of simulating, based on the control command, the operation of the axis and outputting virtual responses. The process of determining that the operation of the axis has been completed further includes determining, based on the virtual responses, that the operation of the axis is complete.

Effects of the Invention

According to each aspect of the present disclosure, it is possible to predict, without using actual machining data, an accurate machining time even when a stop command for an axis is frequently described in a machining program or even when an axis with a high inertia is mounted on a machine tool.

PREFERRED MODE FOR CARRYING OUT THE INVENTION

The following describes embodiments of the present disclosure in detail with reference to the accompanying drawings.

First Embodiment

Figure 1:
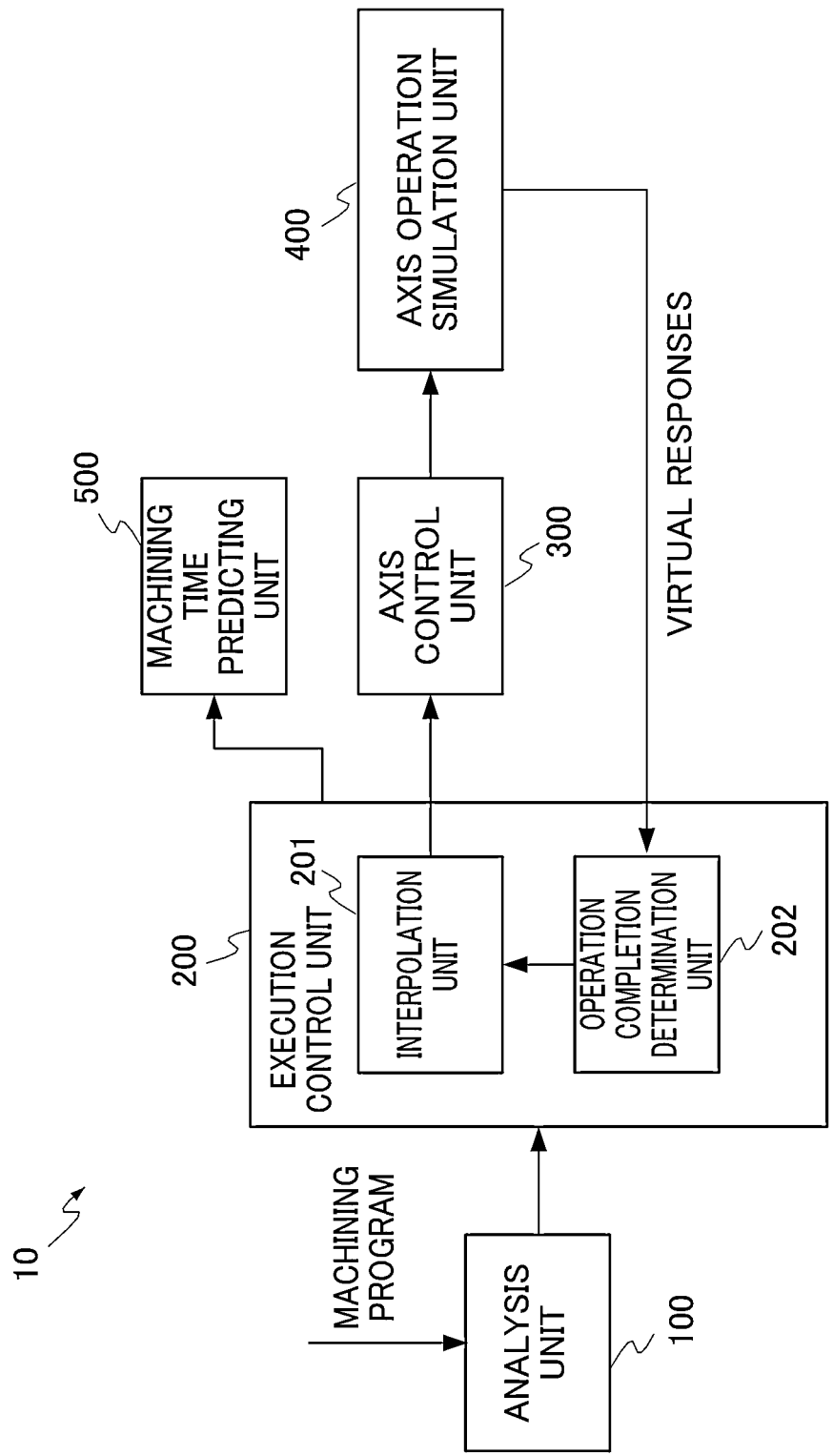
FIG. 1 is a block diagram illustrating a configuration of a machining time predicting apparatus according to a first embodiment of the present disclosure.

FIG. 1 is a block diagram illustrating a configuration of a machining time predicting apparatus according to a first embodiment of the present disclosure. The machining time predicting apparatus 10 includes an analysis unit 100, an execution control unit 200, an axis control unit 300, an axis operation simulation unit 400, and a machining time predicting unit 500. The execution control unit 200 includes an interpolation unit 201 and an operation completion determination unit 202. The machining time predicting apparatus 10 predicts, based on a machining program, a machining time (an execution time of a machining program) for a machine tool to machine a workpiece by controlling at least one axis. The analysis unit 100, the interpolation unit 201, and the axis control unit 300 constitute a numerical control apparatus (hereinafter referred to as an NC apparatus). The operation completion determination unit 202 may be provided inside the NC apparatus together with the interpolation unit 201 or may be provided outside the NC apparatus. The machining time predicting unit 500 may be provided in the NC apparatus. The following describes each unit constituting the machining time predicting apparatus 10.

The analysis unit 100 interprets a numerical control (NC) program serving as a machining program and analyze the NC program into codes and values to obtain a movement distance, a movement path, and a command speed (which are operation commands for the axis). The machining program defines an operation of positioning a feed axis and controlling a speed of a spindle axis.

The execution control unit 200 includes the interpolation unit 201 and the operation completion determination unit 202. The interpolation unit 201 manages execution of the operation commands and commands an operation of the axis based on results of the analysis of the NC program. Specifically, based on the movement distance, the movement path such as a straight line or an arc, and the command speed which have been obtained by the analysis unit 100, the interpolation unit 201 generates interpolation data (which is an operation command for the axis) by performing an interpolation calculation of a point on the movement path in an interpolation cycle and output the interpolation data to the axis control unit 300.

The operation completion determination unit 202 determines that the operation of the axis is complete based on control commands that is output from the axis control unit 300 or the axis operation simulation unit 400 and virtual responses that are output from the axis operation simulation unit 400. The virtual responses include outputs from the axis operation simulation unit 400, and the outputs include, for example, a position, a position deviation, and a speed or a velocity deviation that pertain to the feed axis, and a rotational speed that pertains to the spindle axis. The operation completion determination unit 202 performs, for example, an operation completion confirmation with respect to a movement command (positioning) for the feed axis and an operation completion confirmation with respect to a change in the rotational speed (speed change) of the spindle axis based on the virtual responses. The operation completion confirmation operation by the operation completion determination unit 202 is described in detail later.

The axis control unit 300 generates, based on the operation command for an axis from the interpolation unit 201, the control command and output the control command to the axis operation simulation unit 400. Specifically, the axis control unit 300 generates an acceleration/deceleration profile based on the interpolation data, and distributes the acceleration/deceleration profile to each control axis, thereby providing to the axis operation simulation unit 400 a position command value or a speed command value for each control period of a servo motor and a spindle axis motor that serve as an electric motor drive of the feed axis and an electric motor drive of the spindle axis, respectively.

The axis operation simulation unit 400 performs a simulation of servo control that causes the electric motor drive for driving the feed axis and the electric motor drive for driving the spindle to follow the position command value or the speed command value, and a simulation of an operation of the machine tool. The axis operation simulation unit 400 then outputs the virtual responses to the operation completion determination unit 202. The axis operation simulation unit 400 outputs the control command such as the position command value and the speed command value to the operation completion determination unit 202. The axis operation simulation by the axis operation simulation unit 400 is described in detail later.

The machining time predicting unit 500 uses the moving distance, the moving path, the command speed, and the like, which are obtained by the analysis unit 100, to obtain a command time of the machining program, and predicts the machining time (the execution time of the machining program) from the obtained command time and a waiting time. The waiting time is obtained from the control command that is output from the axis control unit 300 or the operation completion determination unit 202 and the notification of the completion confirmation from the operation completion determining unit 202. In addition, the control command that is input to the machining time predicting unit 500 may be output from the axis control unit 300 or the axis operation simulation unit 400. The machining time predicting operation by the machining time predicting unit 500 is described in detail later. The waiting time is, for example, a time period from a time at which the speed command value is set to a speed "0" (stopped) to a time at which the speed command value decreases to reach a position range with a designated latitude or a range with a stop determination latitude in which it is determined to have stopped with a speed of "0". The waiting time is, for example, a time period from a time at which the speed command value is set to a target speed to a time at which a speed increases and reaches a range with the arrival latitude for the target speed. In a case in which a command for accelerating and stopping the axis is repeated by the machining program, the machining time predicting unit 500 adds a sum of the command times and a sum of the waiting times to predict the machining time.

Next, the axis operation simulation unit 400, the operation completion determination unit 202, and the machining time predicting unit 500 are further described.

Axis Operation Simulation Unit 400

The axis operation simulation unit 400 simulates an operation of the feed axis that draws a path based on the machining program and an operation of the spindle axis that rotates a tool or a workpiece. For example, in a case in which the axis to be simulated is the feed axis, the axis operation simulation unit 400 can be illustrated as the block diagram of transfer functions in FIG. 2. The block diagram in FIG. 2 has a configuration similar to a block diagram disclosed in Japanese Unexamined Patent Application, Publication No. H03-110607. The axis operation simulation unit 400 is composed of a combination of transfer functions including transfer functions 401 to 407.

Figure 2:
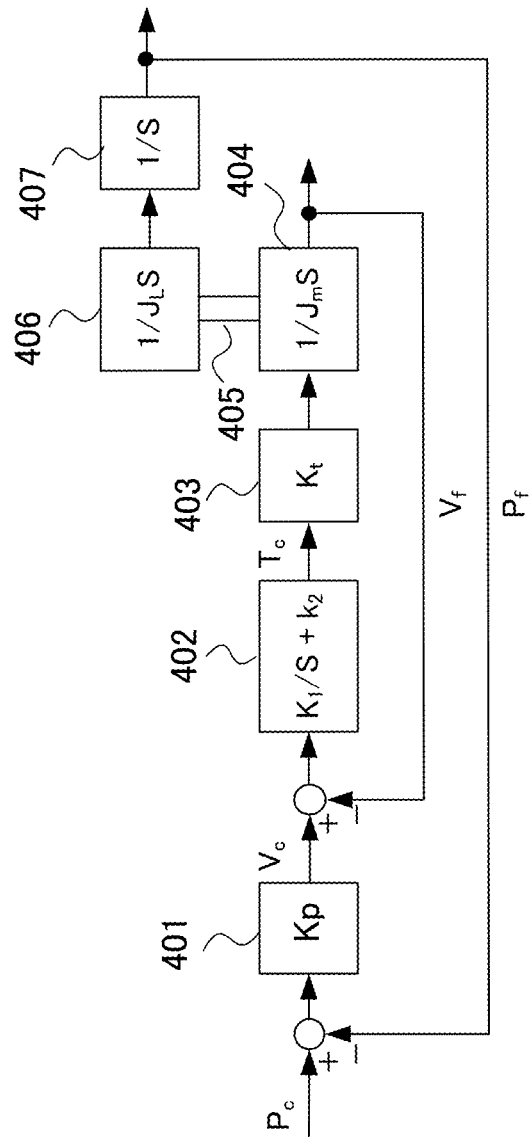
FIG. 2 is a block diagram of transfer functions of an axis operation simulation unit when the axis operation simulation unit simulates an operation of a feed axis.

In FIG. 2, the transfer function 401 is a transfer function for indicating a position loop, in which $K_p$ represents a position gain. The transfer function 402 is a transfer function for indicating a velocity loop, in which $k_1$ represents an integral gain and $k_2$ represents a proportional gain. The transfer functions 403 and 404 are transfer functions of a motor. $K_t$ represents a torque constant, and $J_m$ represents a motor inertia (a moment of inertia). The transfer function 405 represents a ball screw or the like, which is a coupling portion between the servo motor and a machine. The transfer function 406 is a transfer function of the machine, and $J_L$ represents an inertia of the machine. The transfer function 407 is a transfer function of an integration element for integrating a speed of a movable part of the machine to obtain a position of the machine.

The position loop indicated by transfer function 401 and the velocity loop indicated by transfer function 402 form a servo control model, and the motor, ball screw, and the like, and integration element indicated by the transfer functions 403, 404, 405, 406, and 407 form a plant model. The servo motor has an angular velocity that can be obtained by a differential equation given in Equation 1 (Eq. 1 below). The plant model includes a numerical solution in which the differential equation is used. In Equation 1, $\omega$ represents an angular velocity, $\tau$ represents a torque, and $J_m$ represents a motor inertia.

$$d\omega/dt = \tau(t)/J_m \qquad [\text{Eq. 1}]$$

The position deviation is obtained by subtracting, from a position command $P_c$ that is output from the axis control unit 300, a feedback signal $P_f$ for the position of the machine that is detected by a linear scale or the like. The position deviation is multiplied by the position gain $K_p$ to obtain a speed command $V_c$. The velocity deviation is obtained by subtracting, from the speed command $V_c$, a feedback value $V_f$ of a motor speed detected by a pulse coder or the like attached to the servo motor. The velocity deviation is proportionally integrated to obtain a torque command $T_c$ (current command). The servo motor is driven based on the torque command $T_c$, and the position and speed of the servo motor are controlled with feedback of a closed loop system. The axis operation simulation unit 400 may be configured such that the transfer function 407 integrates the angular velocity of the servo motor to obtain the angle of the servo motor, and the angle of the servo motor is converted to the position of the machine to obtain a value regarded as the position of the machine.

Figure 3:
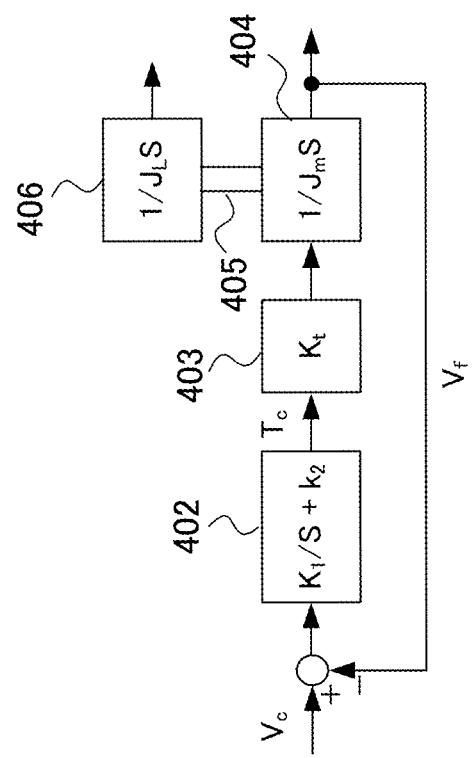
FIG. 3 is a block diagram of transfer functions of the axis operation simulation unit when the axis operation simulation unit simulates an operation of a spindle axis.

For example, in a case in which the spindle axis is to be simulated, the axis operation simulation unit 400 can be illustrated as the block diagram of transfer functions in FIG. 3. The block diagram illustrated in FIG. 3 corresponds to the block diagram shown in FIG. 2 from which the transfer functions 401, 407 that relate to the loop of the feedback signal $P_f$ for the position of the machine have been removed.

The transfer functions 402, 403 and 404 illustrated in FIG. 3 are the same as the transfer functions 402, 403, and 404 illustrated in FIG. 2. The motor represented by the transfer functions 403 and 404 in FIG. 3 are each a servo motor or an induction motor. The transfer function 406 in FIG. 3 is a transfer function for the spindle axis. The transfer function 405 illustrated in FIG. 3 represents a coupling portion between the motor and the spindle axis. The coupling portion may be constituted by a coupling that directly couples the rotary axis of the motor to the spindle axis, or a gear mechanism or a belt-and-pulley mechanism that reduces and increases the rotational speed of the motor and transmits the speed to the spindle axis. The transfer function 404 of the motor outputs a value $V_f$ that is obtained by converting an angular velocity of the motor to the rotational speed of the spindle axis, and the transfer function 402 of the velocity loop performs velocity control to make a spindle axis rotational speed command $V_c$ consistent with the output $V_f$ of the transfer function 404.

The transfer functions in FIG. 3 function as the spindle axis operation simulation unit even in a case in which the transfer functions are configured such that the output of the transfer function 406 is set to Vf. Further, the transfer functions in FIG. 3 function as the spindle axis operation simulation unit in which Jm represents the sum of the motor inertia and the spindle axis inertia even in a case in which the transfer function 405 and the transfer function 406 are removed.

Figure 4:
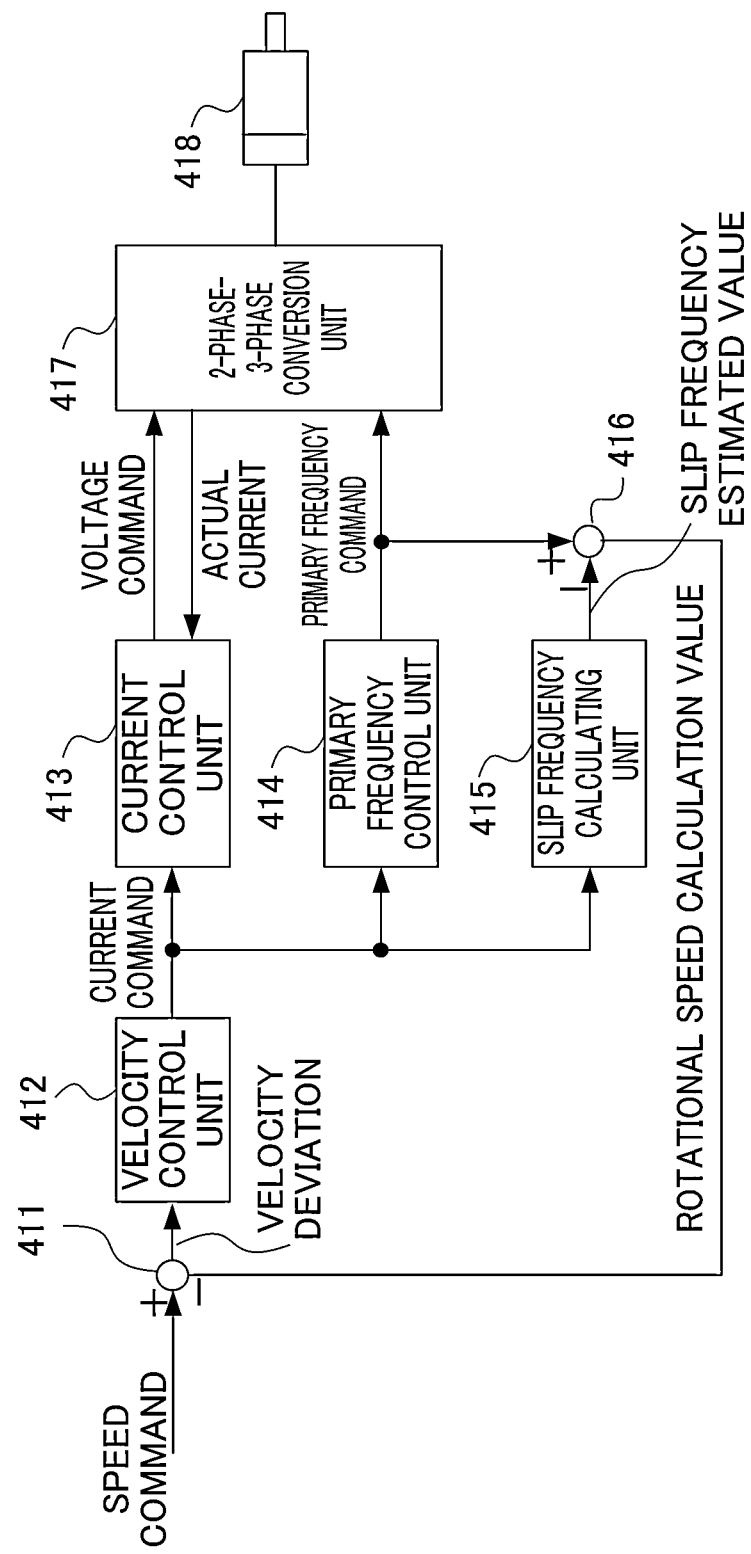
FIG. 4 is a block diagram illustrating a configuration of the axis operation simulation unit when the axis in the axis operation simulation unit is the spindle axis.

For example, in a case in which the spindle axis and the motor are to be simulated, the axis operation simulation unit 400 can be illustrated as the block diagram of transfer functions in FIG. 4. The block diagram in FIG. 4 has a configuration similar to a block diagram disclosed in Japanese Unexamined Patent Application, Publication No. 2020-5406. The block diagram illustrated in FIG. 4 corresponds to the block diagram illustrated in Japanese Unexamined Patent Application, Publication No. 2020-5406 from which a proximity switch, a rotational speed calculation unit that uses the number of pulses detected from the proximity switch, and a speed command compensating unit have been removed. Except for the removed proximity switch, the rotational speed calculation unit that uses the number of pulses detected from the proximity switch, and the speed command compensation unit, the configuration and operation of the axis operation simulation unit 400 are the same as the configuration and operation described in Japanese Unexamined Patent Application Publication No. 2020-5406, and thus a detailed description thereof is omitted.

As illustrated in FIG. 4, the axis operation simulation unit 400 includes a subtractor 411, a velocity control unit 412, a current control unit 413, a primary frequency control unit 414, a slip frequency calculating unit 415, a subtractor 416, a 2-phase-3-phase conversion unit 417, and an induction motor 418.

The subtractor 411 calculates a difference between a speed command value output from the axis control unit 300 and a rotational speed estimated value output from a subtractor 416 that is described later and outputs a velocity deviation. The velocity control unit 412 generates a current command value (torque command value) by performing, for example, PI (proportional, integral) control on the velocity deviation obtained by the subtractor 411.

The current control unit 413 generates a voltage command value (a d-phase voltage command value and a q-phase voltage command value) based on the current command value (torque command value) generated by the velocity control unit 412 and a drive current value of the induction motor 418, which is described later.

The primary frequency control unit 414 generates a primary frequency command value based on the current command value (torque command value) generated by the velocity control unit 412.

The slip frequency calculating unit 415 calculates a slip frequency estimated value based on the current command value (torque command value) generated by the velocity control unit 412.

The subtractor 416 calculates a difference between the primary frequency command value from the primary frequency control unit 414 and the slip frequency estimated value obtained by the slip frequency calculating unit 415, and outputs the difference as a rotational speed calculation value of the induction motor 418.

The 2-phase-3-phase conversion unit 417 converts the d-phase voltage command value and the q-phase voltage command value generated by the current control unit 413 into voltage command values of the U, V, and W phases based on the primary frequency command value from the primary frequency control unit 414, thereby generating a voltage command value for driving the induction motor 418.

The drive current value of the induction motor 418 can be calculated, for example, by providing a voltage command value generated previously to a state equation of the induction motor 418 as a voltage. The state equation of the induction motor and the method of calculating the current are, for example, described in a Non-Patent Document: Murata, Tsuchiya, Takeda, "Vector Control for Induction Machine by Primary Flux Linkage Control", Collected papers of the Society of Instrument and Control Engineers, Vol. 25, No. 11, Pages 1194-1201 (1989).

Figure 5:
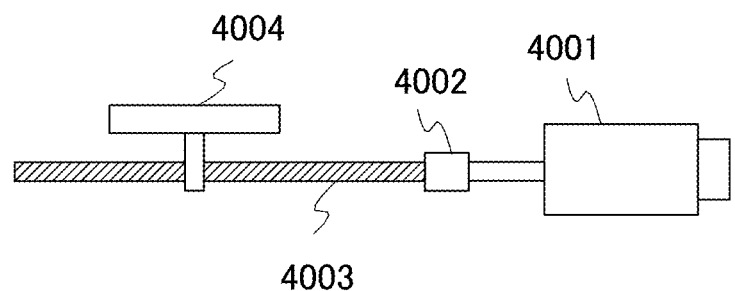
FIG. 5 is a diagram illustrating a drive system including a motor, a coupling, and a ball screw.

The angular velocity of the motor, when considering friction, can be calculated as follows. FIG. 5 illustrates a drive system including a motor 4001, a coupling 4002, a ball screw 4003, and a table 4004, and the motor 4001 is subject to a friction torque $f_m$ that is represented by Equation 2 (Eq. 2 below). The friction torque $f_m$ and the angular velocity $\omega_m$ of the motor are related as illustrated by the characteristic diagram in FIG. 6. In Eq. 2, $J_m$ denotes a sum of moments of inertia of a rotor of the motor, coupling, and ball screw, and $\omega_m$ denotes the angular velocity of the motor. A simulation is performed in which the angular velocity $\omega_m$ is updated at each time $\Delta t$. The number of updates is denoted by k, and the angular velocity at time $k\Delta t$ is denoted by $\omega m[k]$.

$$f_m[k] = C_{1m}\omega_m[k-1] + F_m \quad (C_{2m}\omega_m[k-1] > F_m) \quad \text{[Eq. 2]}$$

$$f_m[k] = C_{1m}\omega_m[k-1] - F_m \quad (C_{2m}\omega_m[k-1] < F_m)$$

$$f_m[k] = C_{1m}\omega_m[k-1] +$$

$$C_{2m}\omega_m[k-1](C_{2m}\omega_m[k-1] > F_m, C_{2m}\omega_m[k-1] < \text{except for } F_m)$$

Figure 6:
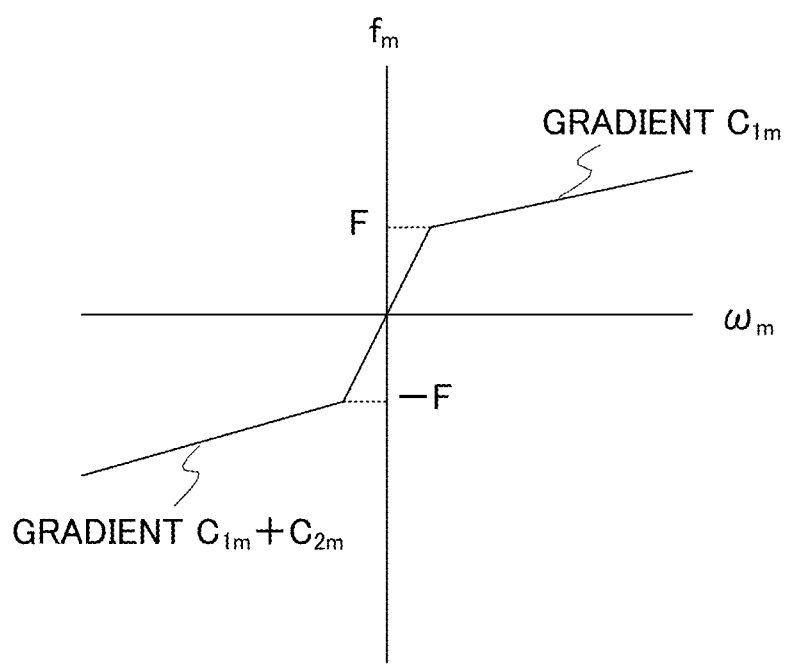
FIG. 6 is a characteristic diagram illustrating a relationship between a friction torque and an angular velocity of the motor.

By changing the subscripts in Equation 2 and FIG. 6 from "m" to "L", it is possible to obtain a frictional torque $f_L[k]$ that acts on the table. $J_L$ denotes a value obtained by converting a mass of the table into a moment of inertia, and $\omega_L$ denotes a value obtained by converting a velocity of the table into an angular velocity.

The torque τm[k] applied to the motor and the torque τL[k] applied to the table are obtained using Equation 3. In Equation 3, τin denotes an input torque supplied to the motor, and Ks denotes a torsional stiffness between the motor and the table.

$$\tau_m[k] = \tau_{in}[k] - K_s\delta[k] - f_m[k] \quad \text{[Eq. 3]}$$

$$\tau_L[k] = K_s\delta[k] - f_L[k]$$

$$\delta[k] = \Delta t(\omega_m[k-1] - \omega_L[k-1]) + \delta[k-1]$$

By using the torque τm[k] and the torque τL[k] illustrated in the Equation 3, it is possible to obtain the relational expression of Equation 4 (Eq. 4 below). In Equation 4, $\omega_m$ represents the angular velocity of the motor, and $\omega_L$ represents an angular velocity obtained by converting the velocity of the table.

$$\omega_m[k] = \frac{\Delta t}{J_m}\tau_m[k] + \omega_m[k-1] \quad \text{[Eq. 4]}$$

$$\omega_L[k] = \frac{\Delta t}{J_L}\tau_L[k] + \omega_L[k-1]$$

Static friction F causes controllability of the servo to deteriorate at lower speeds. By considering the static friction in the calculation of the angular velocity, it is possible to increase the predicting accuracy of the operation completion waiting time described later.

For example, in a case in which the axis is a contour control rotary axis, the axis operation simulation unit can be made capable of changing, with a command in the machining program, whether the axis operation simulation is the feed axis or the spindle axis. The contour control rotary axis is defined, for example, as follows in "9. The contour control rotation axis and the indexing axis (2018 Jul. 24)" of https://www.jmtba.or.jp/exportcontrol:

"A rotary axis capable of performing contour control refers to an axis that has an axis name, is controlled by a numerical controller (NC) provided to the machine tool main body, is intended for turning, milling, grinding (hereinafter referred to as "cutting"), and satisfies all of the following conditions.
  (1) An axis whose rotational operation can be used as a cutting feed.
  (2) An axis for which a cutting feed command can be issued simultaneously with commands for other linear axes and other rotary axes.
  (3) An axis that, when a command therefore is issued at the same time as commands for other linear axes or rotary axes, performs an interpolation operation along a designated path".

Figure 7:
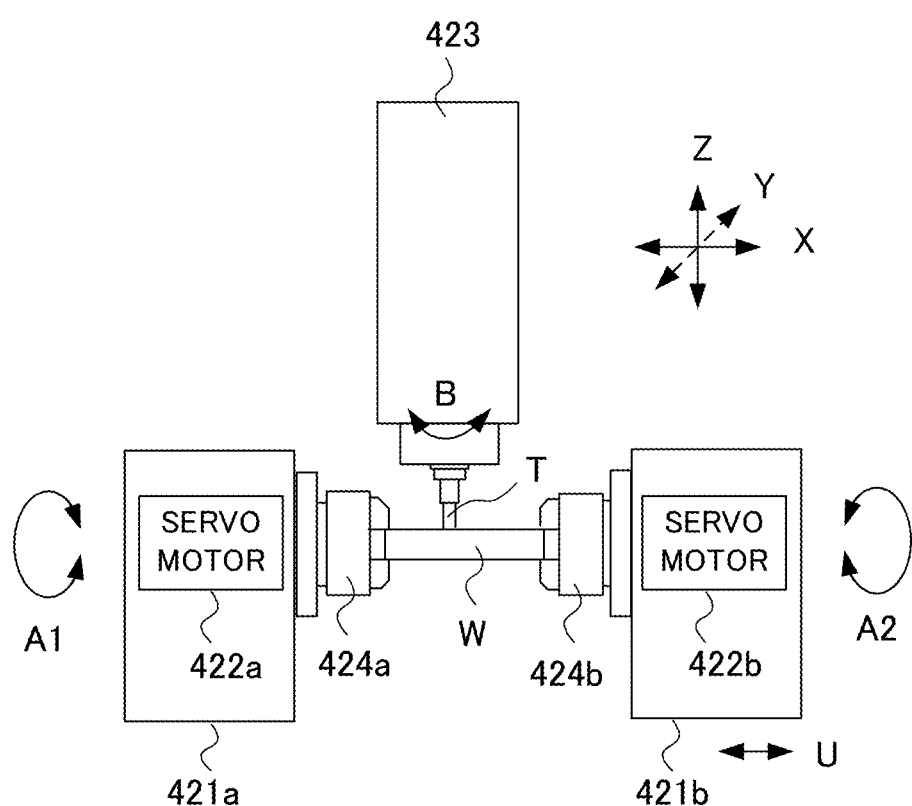
FIG. 7 is a configuration diagram illustrating a machining center with a configuration for machining a turbine blade W.

As an example of the contour control rotary axis, Japanese Unexamined Patent Application, Publication No. 2014-121746, for example, discloses a machining center that machines a turbine blade W. FIG. 7 is a configuration diagram illustrating a machining center with a configuration for machining a turbine blade W. The machining center illustrated in FIG. 7 includes a pair of stands 421a and 421b having clamp mechanisms 424a and 424b capable of holding the turbine blade W, and a stand 423 on which a tool T can be mounted. The stand 421a and the stand 421b incorporate a servo motor 422a and a servo motor 422b, respectively, for rotating an axis (not shown). The stand 421a is installed with an orientation such that the axis is rotatable about an A1 axis that is parallel to a horizontal axis. On the other hand, the stand 421b is installed with an orientation such that the clamp mechanisms 424a and 424b face each other and the spindle axis is rotatable around an A2 axis that is coaxial with the A1 axis.

The stand 421b can slide in a U-axis direction that is parallel to the A1 axis and the A2 axis (also an X axis in FIG. 1). The stand 423 is rotatable around a B-axis that is parallel to a front-back direction (Y-axis direction) in FIG. 7. Further, the tool T is mounted on the spindle axis (not shown) installed inside the stand 423 and is rotatable together with the spindle axis by the servo motor (not shown).

The machining center of FIG. 7, executes a machining program for machining a workpiece W into a turbine blade. When machining the workpiece W into the turbine blade having a blade portion, the A1 axis and the A2 axis operate as feed axis. A central portion of the workpiece is machined into a blade shape by the rotating tool T such as an end mill. In contrast, when machining a cylindrical shape at an end of the workpiece, the A1 axis and the A2 axis operate as the spindle axis. Turning is performed on a rotating workpiece W by using a tool T such as a turning tool. That is, the A1 axis and the A2 axis are rotary axis driven by the servo motors 422a and 422b, and, in accordance with a command in the machining program, can function as a feed axis and a spindle axis during the machining program.

Operation Completion Determination Unit 202

As described above, the operation completion determination unit 202 determines that the operation is complete based on the control command output from the axis control unit 300 or the axis operation simulation unit 400 and virtual responses output from the axis operation simulation unit 400.

(1) Operation for Determining Operation Completion When the Feed Axis or Spindle Axis is Stopped
In a case in which the speed command value is set to the speed "0" (stopped), the operation completion determination unit 202 determines the completion of the operation based on whether the feed axis or the spindle axis has decelerated and fallen within a position range with a designated latitude or fallen within a range with a stop determination latitude in which it is determined to have stopped with a speed of "0" Whether or not the feed axis or the spindle axis has decelerated and fallen within the position range with the designated latitude is determined by the operation completion determination unit 202 determining the positioning of the feed axis or the spindle axis with an in-position check. In a case in which the speed command value is set to the speed "0" (stopped), the operation completion determination unit 202 performs the in-position check, and determines that the operation is complete when the feed axis or the spindle axis is in-position. The in-position means that the motor arrives within the latitude of the commanded position.

Figure 8:
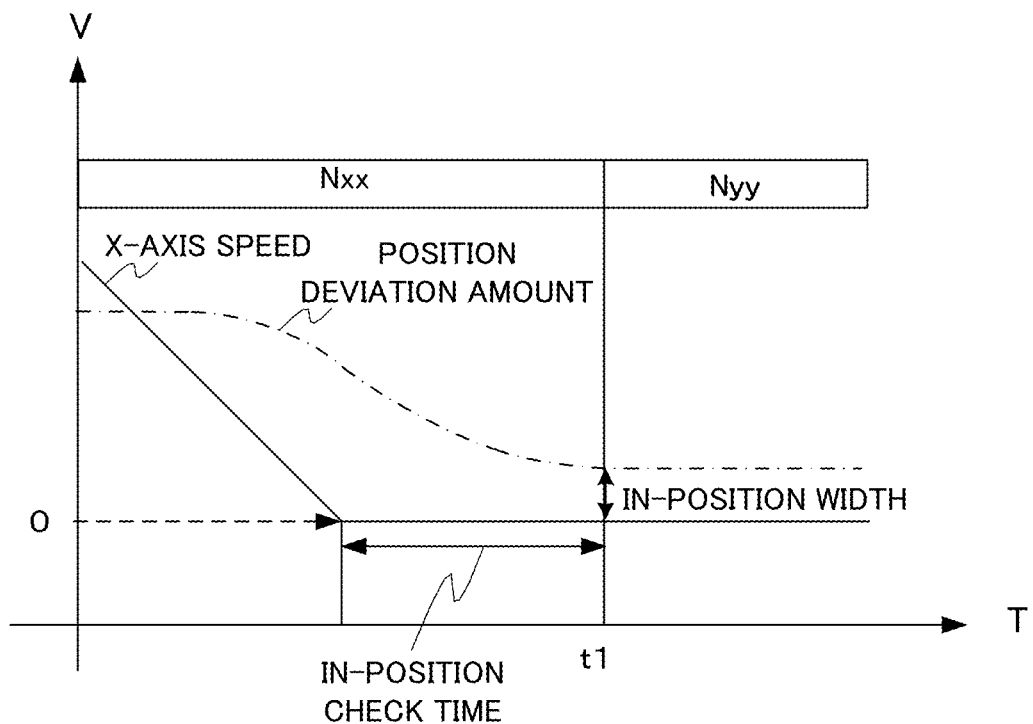
FIG. 8 is a characteristic diagram that describes an in-position check.

FIG. 8 is a characteristic diagram that describes the in-position check. The characteristic diagram illustrated in FIG. 8 illustrates a relationship between a time T, an X-axis speed command at the time T, and a position deviation amount. The position deviation amount forms one of the virtual responses. The operation completion determination unit 202 sequentially acquires the speed command value of the X-axis at the time T from the axis control unit 300 or the axis operation simulation unit 400 and sequentially acquires the position deviation amount at the time T from the axis operation simulation unit 400. Then the operation completion determination unit 202 performs the in-position check when the X-axis speed command value becomes the speed "0" (stopped) in a block Nxx of the machining program and, upon the position deviation amount becoming equal to or less than a preset in-position latitude, determines that the operation is complete and notifies the interpolation unit 201 of the operation completion confirmation. Upon receiving the notification of the operation completion confirmation, the interpolation unit 201 starts an operation of a next block Nyy. FIG. 8 illustrates, as an in-position check, a period from when the X-axis speed command value becomes the speed "0" (stopped) in a block Nxx of the machining program to when the operation of the next block Nyy starts. The operation completion determination unit 202 notifies the machining time predicting unit 500 of the operation completion confirmation. Upon receipt of the notification of the operation completion confirmation, the machining time predicting unit 500 recognizes an end of the block Nxx and measures the machining time.

Figure 9:
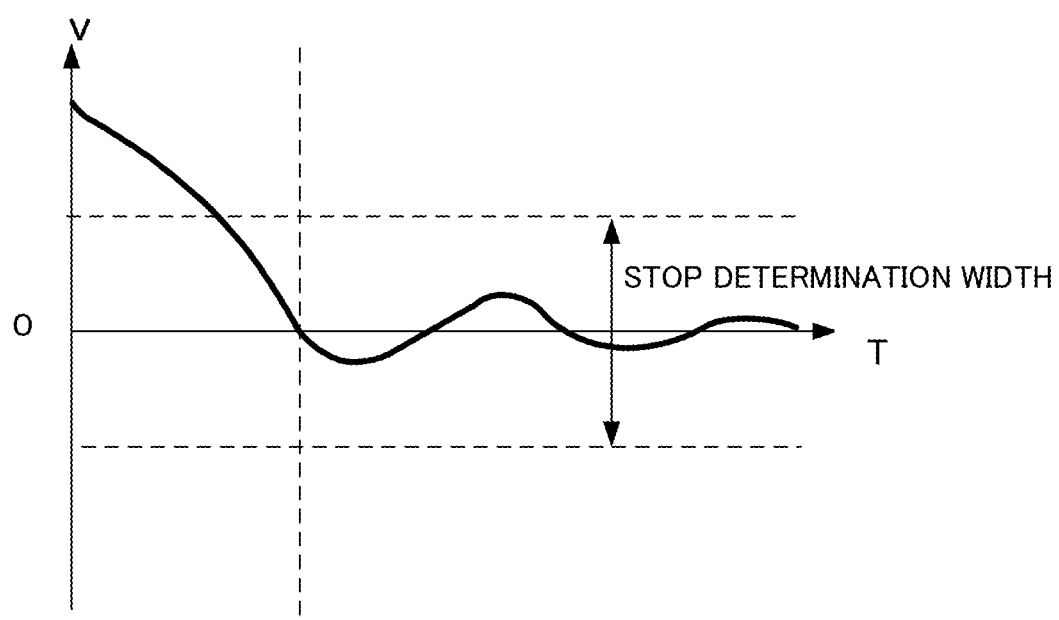
FIG. 9 is a characteristic diagram that describes a stop determination latitude based on speed.

The operation completion determining unit 202 may determine the completion of the operation at the time of deceleration without performing the in-position check, but based on the speed having entered the stop determination latitude. FIG. 9 is a characteristic diagram that describes a stop determination latitude based on speed. The operation completion determination unit 202 sequentially acquires the speed of the X-axis at the time T from the axis operation simulation unit 400. Then, in a case in which the speed of the X-axis falls within a preset stop determination latitude and a predetermined number of oscillations of the velocity falls within a stop determination latitude in a predetermined number of oscillations, the operation completion determination unit 202 determines that the operation has been completed and notifies the interpolation unit 201 of the operation completion confirmation. Upon receiving the notification of the operation completion confirmation, the interpolation unit 201 starts an operation of a next block. The operation completion determination unit 202 notifies the machining time predicting unit 500 of the operation completion confirmation. Upon receipt of the notification of the operation completion confirmation, the machining time predicting unit 500 recognizes an end of the block and measures the machining time.

Figure 10:
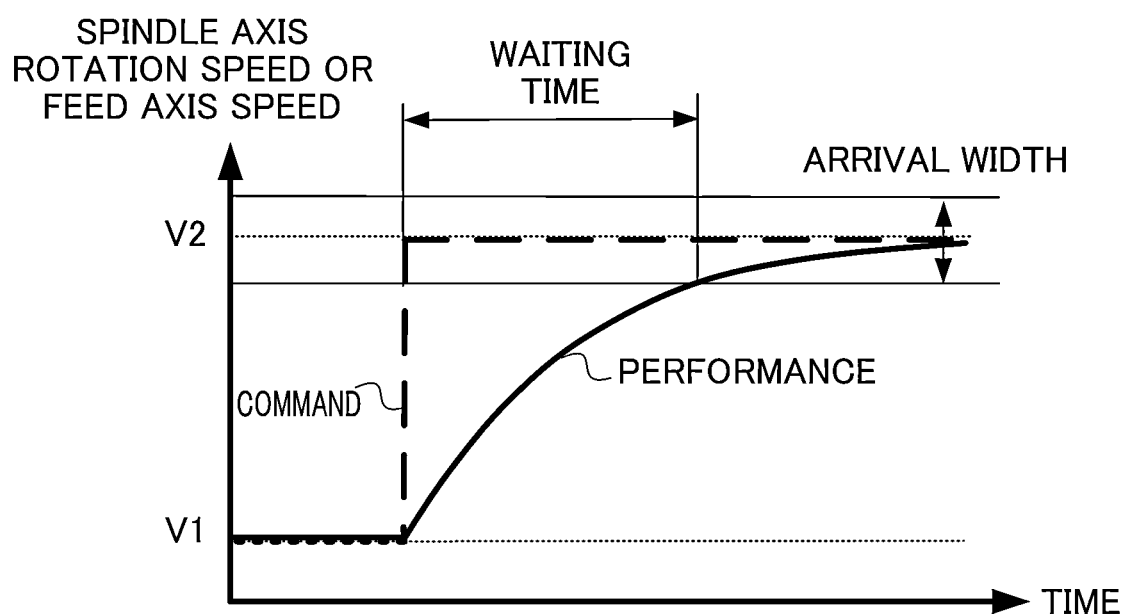
FIG. 10 is a characteristic diagram that describes an arrival latitude for a speed and a waiting time until the speed enters the arrival latitude.

(2) Operation for Determining the Completion of the Operation During Acceleration or Deceleration In a case in which the speed or the spindle axis rotation speed changes, the operation completion determination unit 202 checks whether the speed has reached a preset value and determines the completion of the operation. FIG. 10 is a characteristic diagram that describes, for a time of acceleration, an arrival latitude for a speed and a waiting time until the speed enters the arrival latitude. The operation completion determination unit 202 sequentially acquires the speed of the feed axis or the spindle axis rotational speed at the time T from the axis operation simulation unit 400. Then, upon the speed of the feed axis or rotational speed of the spindle axis falling within a preset arrival latitude, the operation completion determination unit 202 determines that the operation is complete and notifies the interpolation unit 201 of the operation completion confirmation. The operation completion determination unit 202 notifies the machining time predicting unit 500 of the operation completion confirmation. Upon receipt of the notification of the operation completion confirmation, the machining time predicting unit 500 measures the machining time. Also, when decelerating, upon the speed of the feed axis or rotational speed of the spindle axis falling within the preset arrival latitude, the operation completion determination unit 202 can determine that the operation is complete.

Machining Time Predicting Unit 500

Figure 11:
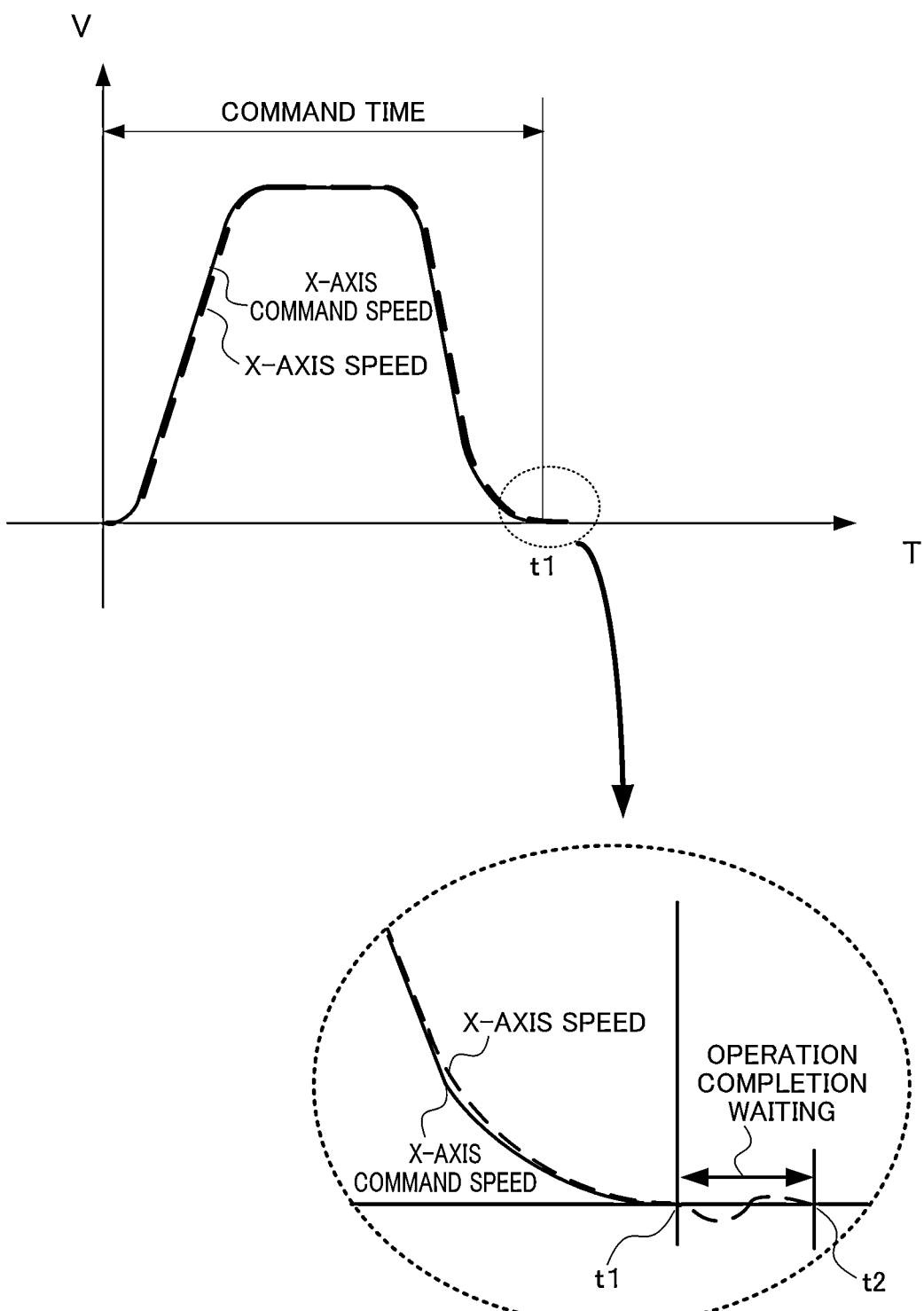
FIG. 11 is a characteristic diagram illustrating an X-axis command speed, an X-axis speed output from the axis operation simulation unit, and a waiting time.

The machining time predicting unit 500 predicts a machining time by measuring a time required for execution of the machining program. For example, as stated above, the machining time predicting unit 500 uses the moving distance, the moving path, the command speed, and the like that are obtained by the analysis unit 100 to obtain a command time of the machining program, measures the time required for execution of the machining program, and predicts the machining time from the obtained command time and the waiting time. The waiting time is obtained from the control command that is output from the axis control unit 300 or the operation completion determination unit 202 and the notification of the completion confirmation from the operation completion determining unit 202. The machining time can be obtained by the sum of the command time and the waiting time. FIG. 11 is a characteristic diagram illustrating an X-axis command speed, an X-axis speed output from the axis operation simulation unit, and a waiting time.

A method of obtaining the command time of the machining program from an analysis result of the analysis unit 100 can be performed by using a well-known technology, for example, a technology related to a machining time predicting apparatus disclosed in Japanese Unexamined Patent Application, publication No. 2012-093975. Japanese Unexamined Patent Application, Publication No. 2012-093975 discloses a machining time predicting apparatus comprising an NC command decoding unit that decodes an NC command, a segment data generating unit that divides a tool path into a plurality of discrete segments, an intermediate memory that stores segment data, a speed limiting processing unit that calculates a speed in a tangential direction of the segments, a segment movement time calculation unit that calculates a time required for the tool to move over each segment based on the speed determined by the speed limiting processing unit, and a total travel time calculating unit that calculates a total time for the tool moving over each segment as a tool travel time. The machining time predicting apparatus calculates a time required for the tool to travel along a path designated by an NC command.

For example, as shown in FIG. 11, a method of obtaining the waiting time when the spindle axis or the feed axis is stopped includes calculating a difference between an operation completion time t2 that is determined by the operation completion determination unit 202 and a time t1 when the speed of the X-axis command speed becomes "0" (stopped). The method of calculating the waiting time for the time of acceleration can also be performed in the same manner. In a case in which the command for accelerating and stopping the axis is repeated by the machining program, the machining time predicting unit 500 adds the sum of the command times and the sum of the waiting times (totals the command times and the waiting times) to predict the machining time.

The time required for execution of the machining program means, for example, from a time when an analysis of the machining program starts to a time when an operation in a last block of the machining program is determined to be complete. It is possible to assume some implementation means in addition to the above-described example in which the time at which the execution of the machining program is started and the time at which the execution of the machining program is completed are set are obtained by the sum of the command times and the waiting times. Considering that the present disclosure has been achieved by focusing on the command time of the axis operation and the operation completion waiting time, the main gist of the present disclosure is unaffected by whether the execution start is set before the command start time of the first axis operation or whether the execution completion is set after the operation completion determination of the last axis operation.

Figure 12:
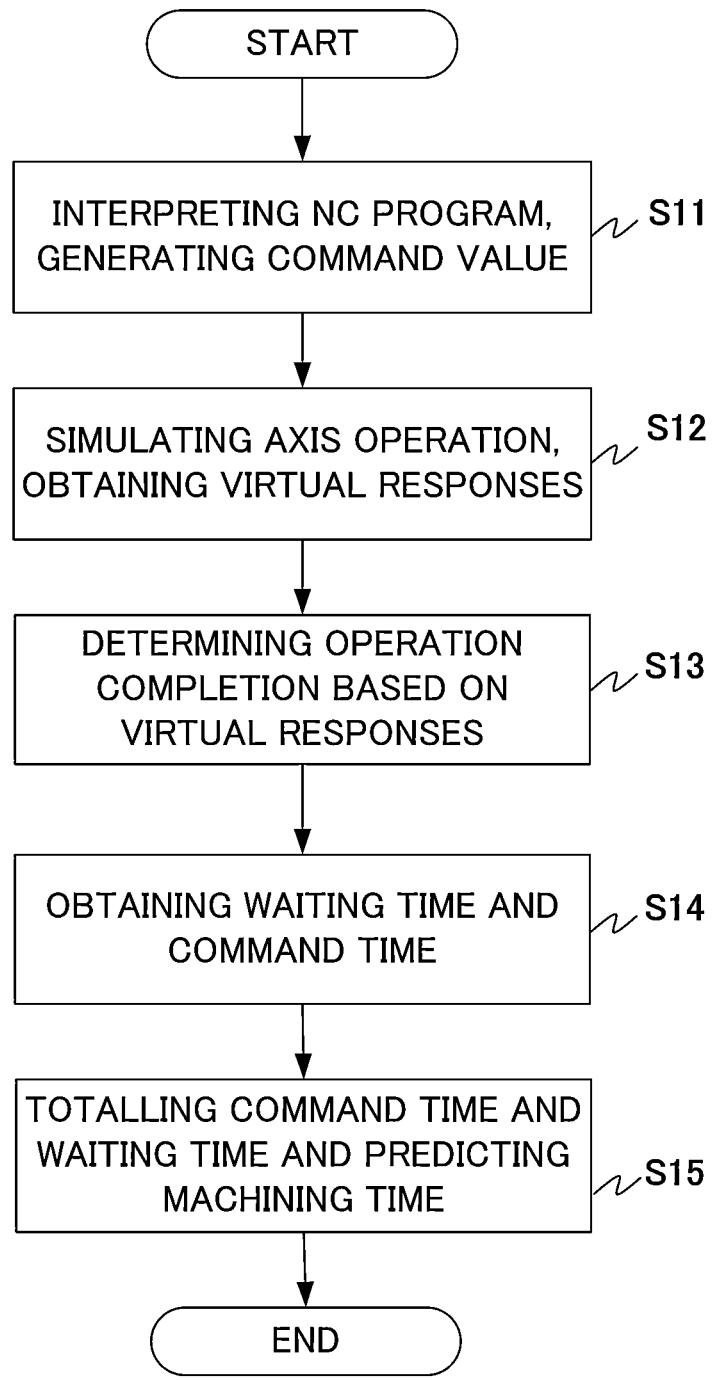
FIG. 12 is a flowchart illustrating a machining time predicting operation of the machining time predicting apparatus.

The above describes a configuration of the machining time predicting apparatus 10. The following describes the machining time predicting operation of the machining time predicting apparatus 10 with reference to a flowchart, making use of an example of a case in which the command for accelerating and stopping an axis is repeated in the machining program. FIG. 12 is a flowchart illustrating the operation of the machining time predicting apparatus 10. In step S11, the analysis unit 100 interprets the NC program and obtains a moving distance, a moving path, and a command speed. Then, the interpolation unit 201 generates interpolation data, and the axis control unit 300 generates a position command value or a speed command value based on the interpolation data.

In step S12, the axis operation simulation unit 400 simulates the servo control and an operation of the machine tool and to output virtual responses to the operation completion determination unit 202. In the simulation of the operation of the servo control and the machine tool, the electric motor drive for driving the feed axis and the electric motor drive for driving the spindle axis are driven so as to follow the position command value or the speed command value.

In step S13, the operation is determined to be complete based on a command output from the interpolation unit 201 and the virtual responses output from the axis operation simulation unit 400.

In step S14, the machining time predicting unit 500 obtains the command time of the machining program from the interpolation data obtained by the interpolation unit 201 and obtains a waiting time from the notification of the operation completion confirmation from the operation completion determination unit 202.

In step S15, the machining the machining time predicting unit 500 adds the sum of the command times and the sum of the waiting times (totals the command time and the waiting time) to predict the machining time.

Second Embodiment

Figure 13:
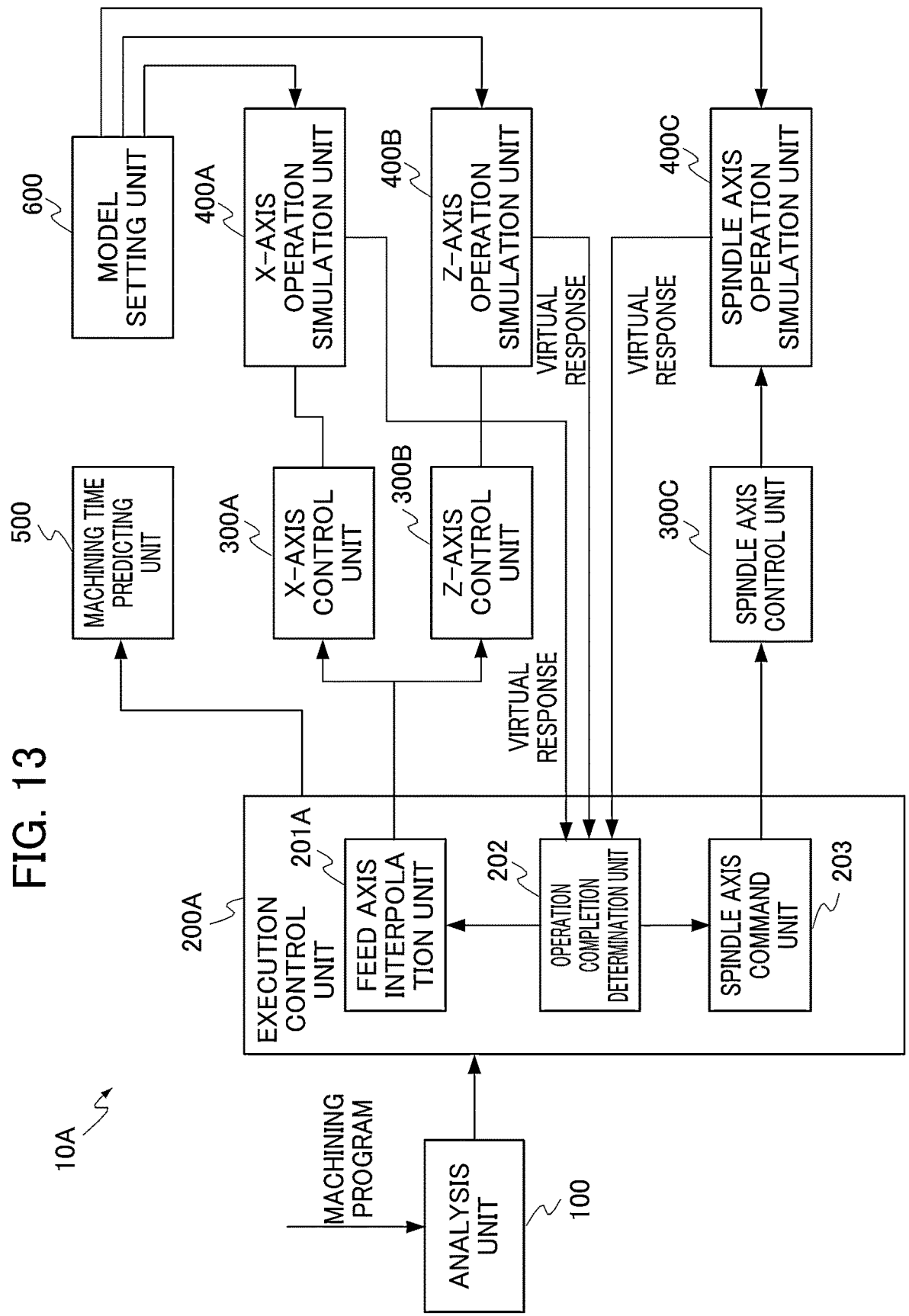
FIG. 13 is a block diagram illustrating a configuration of a machining time predicting apparatus according to a second embodiment of the present disclosure.

FIG. 13 is a block diagram illustrating a configuration of a machining time predicting apparatus according to a second embodiment of the present disclosure. The machining time predicting apparatus 10A illustrated in FIG. 13 is different from the machining time predicting apparatus 10 illustrated in FIG. 1 in that the axis control unit 300 is divided into an X-axis control unit 300A, a Z-axis control unit 300B, and a spindle axis control unit 300C, the axis operation simulation unit 400 is divided into an X-axis operation simulation unit 400A, a Z-axis operation simulation unit 400B, and a spindle axis operation simulation unit 400C, and a model setting unit 600 is added. Further, in the machining time predicting apparatus 10A, the interpolation unit 201 is divided into a feed axis interpolation unit 201A and a spindle axis command unit 203, each with separate functions. The model setting unit 600 sets constants for simulation models of the X-axis operation simulation unit 400A, the Z-axis operation simulation unit 400B, and the spindle axis operation simulation unit 400C. For example, in a case in which the simulation models of the X-axis operation simulation unit 400A and the Z-axis operation simulation unit 400B are represented by the block diagram of transfer functions illustrated in FIG. 2, the model setting unit 600 sets the constants for the integral gain $k_1$, the proportional gain $k_2$, the torque constant $K_t$, the motor inertia $J_m$, and the inertia $J_L$ of the machine inertia.

The feed axis interpolation unit 201A and the spindle axis command unit 203 are capable of operating while mutually referring to the virtual responses. For example, in a case of lathe machining in which constant peripheral velocity control is performed to increase a rotation speed of a lathe increases toward a center of the lathe, the spindle axis command unit 203 refers to a virtual response output from the Z-axis operation simulation unit 400B. In a case in which rigid tapping control is performed in which the spindle axis and the feed axis are interpolated simultaneously and the rotation of the tool and a movement of the Z axis is precisely synchronized, the feed axis interpolation unit 201A refers to a virtual response output from the spindle axis operation simulation unit 400C.

First Modified Example

In the machine tool, the servo control unit of the feed axis may be required to control and cause a feed operation of the feed axis to follow the operation of the spindle axis. For example, this applies to a synchronous operation (a so-called master-slave synchronous method) in which a feed axis is controlled such that it follows the rotation operation of the spindle axis, in consideration of a screw pitch designated by a tap machining program. The following describes, with reference to FIG. 14, a structure of an axis operation simulation in a case in which the feed operation of the feed axis is controlled and caused to follow the operation of the spindle axis.

Figure 14:
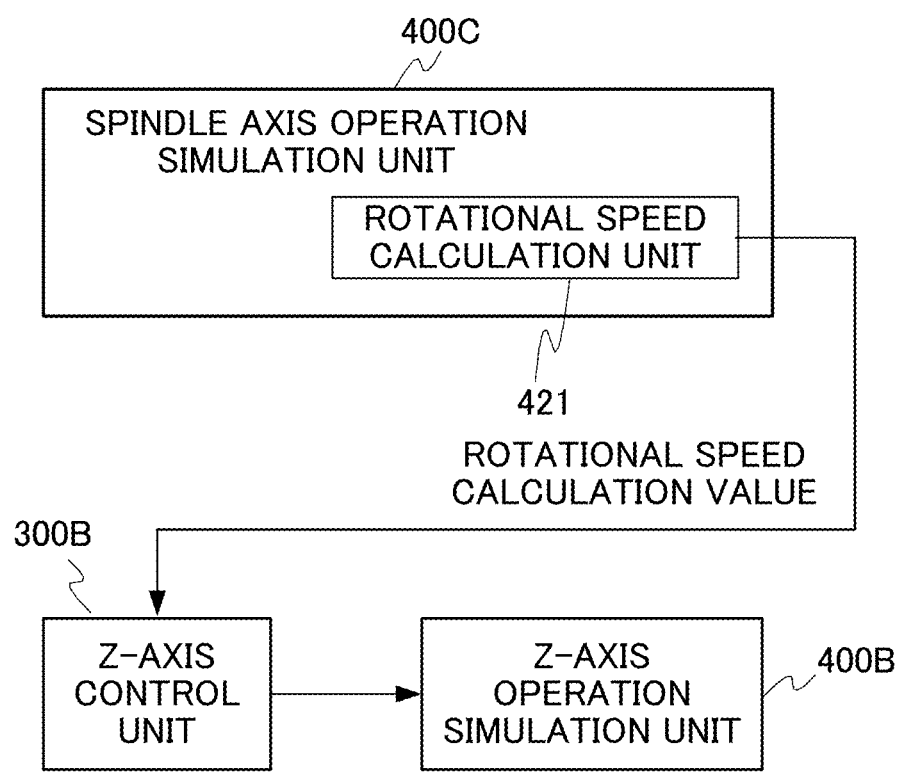
FIG. 14 is a block diagram illustrating a configuration in which a Z-axis operation simulation unit operates to follow an operation of a spindle axis operation simulation unit.

FIG. 14 is a block diagram illustrating a configuration of modified example in which a Z-axis operation simulation unit 400B operates to follow an operation of a spindle axis operation simulation unit 400C. The configuration of the Z-axis operation simulation unit 400B is the same as that illustrated in FIG. 2, and the configuration of the spindle axis operation simulation unit 400C is the same as that shown in FIG. 3. As illustrated in FIG. 14, the rotational speed calculation unit 421 of the spindle axis operation simulation unit 400C outputs a rotational speed calculation value of the spindle axis (which is a virtual response of another shaft) to the Z-axis control unit 300B. The Z-axis control unit 300B calculates, from the rotational speed calculation value of the spindle axis, an operation amount of the feed axis that follows the operation of the spindle axis, and outputs a position command $P_c$ (which is a control command of the axis) illustrated in FIG. 2 to the Z-axis operation simulation unit 400B. The Z-axis control unit 300B can calculate a feed operation amount of the feed axis that follows the operation of the spindle axis by adding the rotational speed calculation value of the spindle axis to obtain the rotary amount of the spindle axis and multiplying the rotary amount of the spindle axis by the screw pitch.

Second Modified Example

The present modification describes an example in which the X-axis operation simulation unit 400A and the Z-axis operation simulation unit 400B of the machining time predicting apparatus 10A illustrated in FIG. 13 are connected to a same DC bus.

Figure 15:
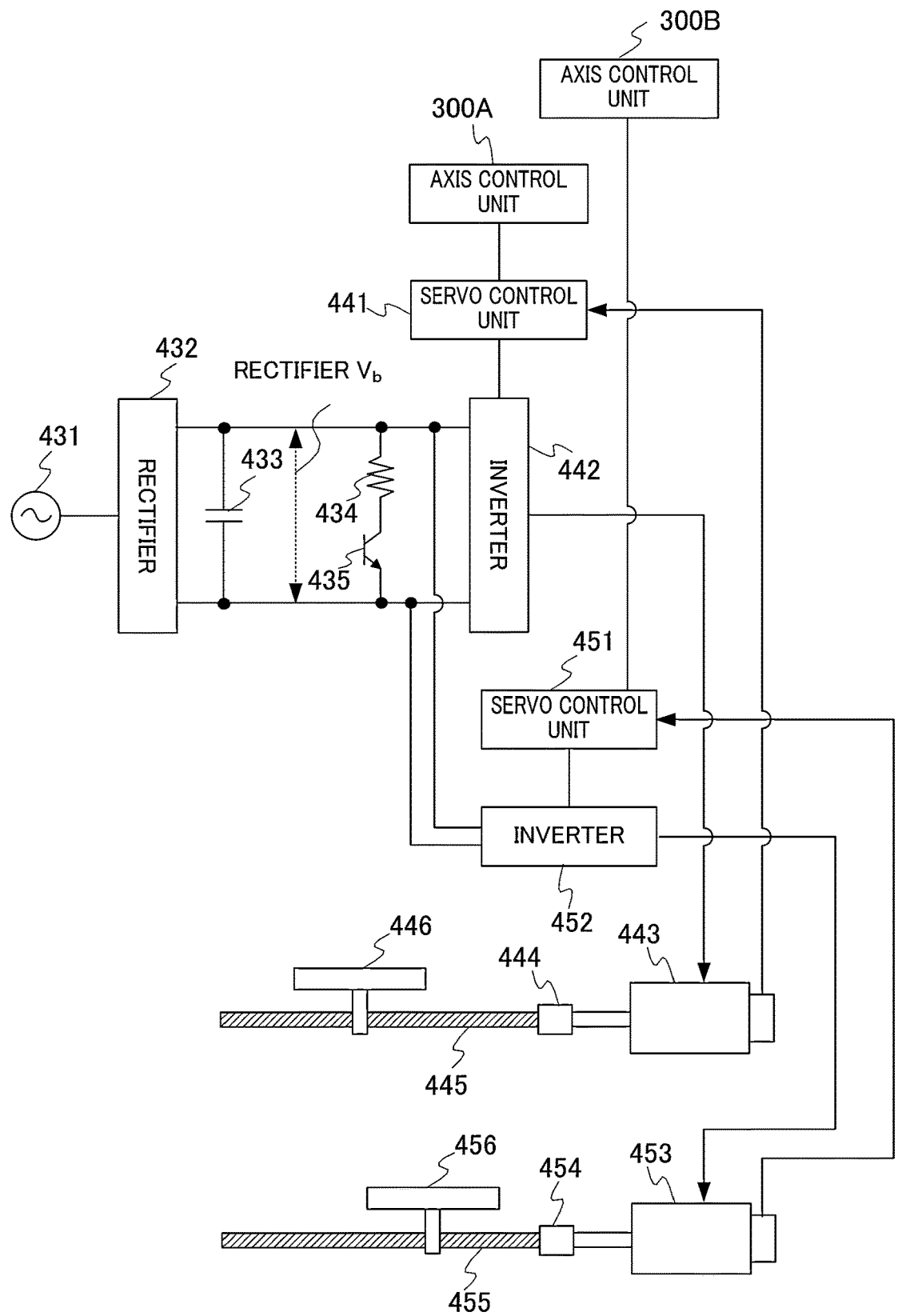
FIG. 15 is a diagram illustrating an example of a configuration in which an X-axis operation simulation unit and a Z-axis operation simulation unit are connected to the same DC bus.

FIG. 15 is a diagram illustrating an example of a configuration in which the X-axis operation simulation unit and the Z-axis operation simulation unit are connected to the same DC bus. In this configuration, the X-axis operation simulation unit and the Z-axis operation simulation unit are connected to the same DC bus, and the X-axis operation simulation unit and the Z-axis operation simulation unit may be connected to respective DC buses. The axis operation simulation unit illustrated in FIG. 15 includes a plurality of machines driven by motors.

The X-axis operation simulation unit 400A includes a servo control unit 441, an inverter 442, a motor 443, a coupling 444, a ball screw 445, and a table 446. The servo control unit 441 forms the servo control model. The inverter 442, the motor 443, the coupling 444, the ball screw 445, and the table 446 form a plant model. The Z-axis operation simulation unit 400B includes a servo control unit 451, an inverter 452, a motor 453, a coupling 454, a ball screw 455, and a table 456. The servo control unit 451 forms the servo control model. The inverter 452, the motor 453, the coupling 454, the ball screw 455, and the table 456 form a plant model. The servo control unit 441 and the servo control unit 451 are represented by the position loop transfer function 401 and the velocity loop transfer function 402 in FIG. 2, respectively. The motor 443 and the motor 453 are represented by the transfer functions 403 and 404 of the motor in FIG. 2, respectively. The coupling 444 and the ball screw 445 are represented by the transfer function 405 in FIG. 2. The coupling 444 and the ball screw 445 are represented by the transfer function 405 in FIG. 2. The tables 446 and the table 456 are each represented by the transfer function 406 in FIG. 2. In a case in which the inverters 442 and 452 are not modeled, the inverters 442 and 452 are expressed as a delay element $(1/(T_s+1))$ or as direct transfer (torque command=motor applied torque).

An AC voltage supplied from an AC power supply 431 is rectified by a rectifier 432, and then smoothed by a smoothing capacitor 433. A regenerative resistor 434 consumes regenerative power when excessive regenerative power is generated and a DC bus voltage (bus line voltage) $V_D$ reaches a default value, and a regenerative transistor 435 turns on upon the bus line voltage reaching a default value, and causes the regenerative resistor 434 to consume power stored in the smoothing capacitor 433. A DC bus is connected to an inverter 442 and the inverter 452, and the DC bus voltage $V_D$ is applied to the inverter 442 and the inverter 452. The model setting unit 600 illustrated in FIG. 13 sets a capacitance value of the smoothing capacitor 433 and a resistance value of the regenerative resistor 434. The DC bus voltage can be calculated from the AC voltage of the AC power supply 431, the capacitance value of the smoothing capacitor 433, the resistance value of the regenerative resistor 434, and the like. The servo control unit 441 supplies a voltage command to the inverter 442 based on a position command value or a speed command value output from the X-axis control unit 300A. The servo control unit 451 supplies a voltage command to the inverter 452 based on a position command value or a speed command value output from the Z-axis control unit 300B. The inverters 442 and 452 each perform a pulse width modulation (PWM) operation or the like on the DC bus voltage $V_D$ and perform power conversion so that a voltage command is applied to the motors 443 and 453, thereby supplying current to the motors 443 and 453.

Figure 16:
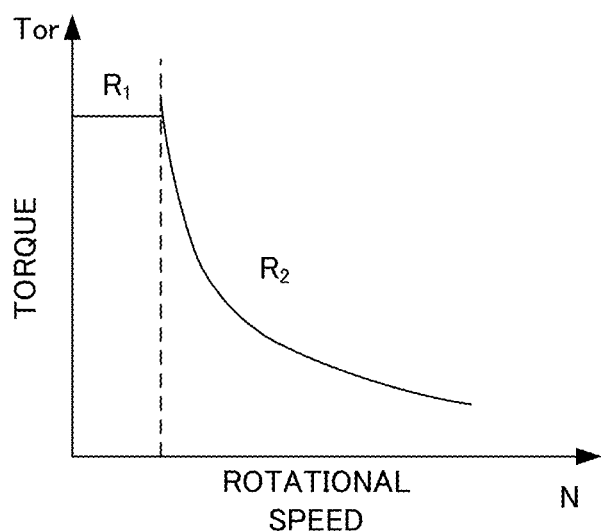
FIG. 16 is a characteristic diagram illustrating a relationship between a maximum torque and a rotational speed of the motor.

As illustrated in the characteristic diagram of FIG. 16, a maximum torque Tor of the motor changes according to the rotational speed N. An N-T characteristic also changes in accordance with a DC link voltage. As the DC link voltage decreases, the region R1 illustrated in FIG. 16 becomes narrower. The DC link voltage $V_D$ and the region R1 are related as follows. The R1 region is a region in which Equation 5 (Eq. 5 below) is satisfied. In Equation 5, $\tau_{LIM}$ denotes allowable electric and mechanical torque of the motor, Kt denotes a torque constant, and Rm denotes a winding resistance.

$$\tau_{LIM} < K_t(V_D - K_t\omega_m)/R_m \quad [\text{Eq. 5}]$$

In the region R1, τmaX=τLIM is satisfied, and a transition to the region R2 occurs upon Equation 6 (Eq. 6 below) being satisfied and depends on the DC link voltage $V_D$.

$$\omega_m = \frac{V_D}{R_m} - \frac{\tau_{LIM}}{K_t} \quad [\text{Eq. 6}]$$

In the R2 region, Equation 7 (Eq. 7 below) is satisfied, and τmax depends on the DC bus voltage $V_D$.

$$\tau_{max} = K_t(V_D - K_t\omega_m)/R_m \quad [\text{Eq. 7}]$$

Figure 17:
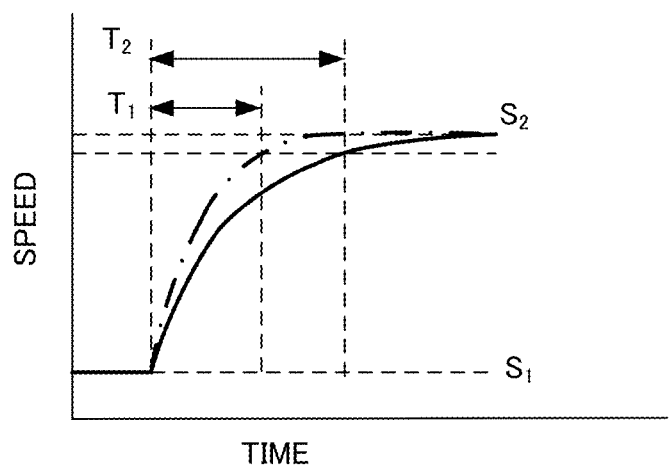
FIG. 17 is a characteristic diagram illustrating a predicted waiting time and a waiting time for which an N-T characteristic is taken into consideration, assuming that $\tau$max of a region R1 is also applied to a region R2.

In a case in which a torsional stiffness, a table inertia, and a friction are ignored in Equation 4, the relational expression of the angular velocity ωm illustrated in Equation 8 can be obtained. The relational expression of the angular velocity ωm illustrated in Equation 8 is obtained using the differential equation given by Equation 1.

$$\omega_m[k] = \frac{\Delta t}{J_m}\tau_{in}[k] + \omega_m[k-1] \quad [\text{Eq. 8}]$$

τin is calculated by velocity servo control, and cannot exceed the maximum value τmax determined by the N-T characteristic. The spindle axis of the machine tool is often required to accelerate and decelerate between a low rotation range and a high rotation range with a maximum torque. While the spindle axis accellerates or decelerates, calculating ωm using Equation 8 in consideration of the N-T characteristic, rather than calculating ωm using Equation 8 with τmax kept constant increases a predicting accuracy of a waiting time until a speed reaches a preset speed. In FIG. 17, a time T1 represents a predicted waiting time assuming that τmax of the region R1 is also applied to the region R2, and a time T2 represents a waiting time in consideration of the N-T characteristic.

According to each embodiment of the present disclosure described above, it is possible to predict, without using actual machining data, an accurate machining time even when a stop command for an axis is frequently described in a machining program or even when an axis with a high inertia is mounted on a machine tool. According to each embodiment, in a case in which a movement amount or a command point sequence is given to a peripheral axis that is responsible for an operation of an auxiliary mechanism such as an automatic tool exchange apparatus, it is possible to predict an operation time of the peripheral axis.

To implement the functional blocks included in the machining time predicting apparatus in the present embodiment, the machining time predicting apparatus can be implemented by hardware, software, or a combination thereof. Here, implemented by software means that being implemented by a computer reading and executing a program.

To implement the functional blocks included in the machining time predicting apparatus in the present embodiment by software or a combination thereof, specifically, the machining time predicting apparatus includes an arithmetic processing unit such as a central processing unit (CPU). The machining predicting apparatus also includes an auxiliary storage apparatus such as a hard disk drive (HDD) in which various control programs such as application software or an operating system (OS) are stored, and a main storage apparatus such as a RAM (random access memory) that stores data temporarily required for the arithmetic processing unit to execute a program.

Then, in the machining time predicting apparatus, the arithmetic processing unit reads the application software or the OS from the auxiliary storage apparatus, and performs arithmetic processing based on the application software or OS while developing, in the main storage apparatus, the application software or the OS that is read. Based on these arithmetic results, various hardware included in each apparatus is controlled. With this configuration, the functional blocks of the present embodiment are implemented.

Each component included in the machining time predicting apparatus can be implemented with hardware such as an electronic circuit. In a case in which the machining time predicting apparatus is configured with hardware, a part or all of the functions of the respective components included in the machining time predicting apparatus can be configured with an integrated circuit (IC) such as an application specific integrated circuit (ASIC), a gate array, a field programmable gate array (FPGA), a complex programmable logic device (CPLD), and the like.

The programs can be stored on various non-transitory computer-readable media and provided to a computer. The non-transitory computer-readable media includes various tangible storage media. Examples of non-transitory computer-readable media include magnetic recording media (for example, hard disk drives), magneto-optical recording media (for example, magneto-optical disks), CD-ROMs (read only memory), CD-Rs, CD-R/Ws, semiconductor memory (for example, a mask ROM, a PROM (programmable ROM), an EPROM (erasable PROM), a flash ROM, and a RAM (random access memory)). The programs may also be provided to a computer by various transitory computer readable media.

The embodiments described above are preferred embodiments of the present disclosure. The scope of the present disclosure is not limited to the above-described embodiments, and various modifications can be made without departing from the gist of the present disclosure.

The machining time predicting apparatus and the machining time predicting method for the machine tool according to the present disclosure can take various embodiments that have the following configurations inclusive of the above-described embodiments.

(1) A machining time predicting apparatus (for example, a machining time predicting apparatus 10, 10A) that predicts, based on a machining program, a machining time for a machine tool to machine a workpiece by controlling at least one axis. The machining time predicting apparatus includes: an analysis unit (for example, an analysis unit 100) that analyzes the machining program to generate an operation command for the axis; an execution control unit (for example, an execution control unit 200) including an interpolation unit (for example, an interpolation unit 201) that manages execution of the operation command and to command an operation of the axis based on a result of analyzing the machining program, and an operation completion determination unit (for example, an operation completion determination unit 202) that determines that the operation of the axis has been completed; an axis control unit (for example, an axis control unit 300) that generates a control command based on the operation command for the axis from the interpolation unit; a machining time predicting unit (for example, a machining time predicting unit 500) that predicts the machining time by measuring a time required for execution of the machining program; and an axis operation simulation unit (for example, an axis operation simulation unit 400) that simulates, based on the control command, the operation of the axis and to output virtual responses. The operation completion determination unit determines, based on the virtual responses, that the operation of the axis is complete. According to this machining time predicting apparatus, it is possible to predict, without using actual machining data, an accurate machining time even when a stop command for an axis is frequently described in a machining program or even when an axis with a high inertia is mounted on a machine tool.

(2) The machining time predicting apparatus according to (1), in which the axis operation simulation unit performs a simulation of an operation of a feed axis and a simulation of an operation of a spindle axis, the feed axis draws a path based on the machining program, and the spindle axis rotates a tool or a workpiece.

(3) The machining time predicting apparatus according to (2), in which the axis operation simulation unit operates to follow an operation of another axis, based on a virtual response of the other axis.

(4) The machining time predicting apparatus according to (2) or (3, in which the axis operation simulation unit performs the axis operation simulation of the feed axis or the spindle axis in a changeable manner in accordance with a command in the machining program.

(5) The machining time predicting apparatus according to any one of (1) to (4), further comprising a model setting unit capable of changing properties of the axis operation simulation unit. The axis operation simulation unit comprises a servo control model that causes the virtual responses to follow the control command, and a plant model. The plant model includes a numerical solution of one or more differential equations and calculates the virtual responses in response to an input of an operation amount. The operation amount is an output of the servo control model.

(6) The machining time predicting apparatus according to (5), in which the plant model includes an electric motor driven by an inverter functioning as a power source for the axis. The machining time predicting apparatus is capable of calculating a DC bus voltage to which the inverter is connected.

(7) The machining time predicting apparatus according to (6), wherein the axis operation simulation unit comprises a plurality of the axis operation simulation units that are provided for two or more axes on a one-to-one basis, and the inverter of each axis operation simulation unit is connected to a same DC bus.

(8) A machining time predicting method performed by a computer serving as a machining time predicting apparatus that predicts, based on a machining program, a machining time for a machine tool to machine a workpiece by controlling at least one axis, the method comprises executing: a process of analyzing the machining program to generate an operation command of the axis; a process of managing execution of the operation command, commanding the operation of the at least one axis based on a result of analyzing the machining program, and determining that the operation of the axis has been completed; a process of generating a control command based on the operation command for the axis; a process of predicting the machining time by measuring a time required for execution of the machining program; and an axis operation simulation process of simulating, based on the control command, the operation of the axis and outputting virtual responses, wherein the process of determining that the operation of the axis has been completed further includes determining, based on the virtual responses, that the operation of the axis is complete. According to this machining time predicting method, it is possible to predict, without using actual machining data, an accurate machining time even when a stop command for an axis is frequently described in a machining program or even when an axis with a high inertia is mounted on a machine tool.

EXPLANATION OF REFERENCE NUMERALS 10, 10A machining time predicting apparatus
100 analysis unit
200 execution control unit
201 interpolation unit
202 operation completion determination unit
300 axis control unit
400 axis operation simulation unit
500 machining time predicting unit
600 model setting unit

The invention claimed is:

1. A machining time predicting apparatus that predicts, based on a machining program, a machining time for a machine tool to machine a workpiece by controlling at least one axis, the machining time predicting apparatus comprising:
an analysis unit that analyzes the machining program to generate an operation command for the axis;
an execution control unit including an interpolation unit that manages execution of the operation command and to command an operation of the axis based on a result of analyzing the machining program, and an operation completion determination unit that determines that the operation of the axis has been completed;
an axis control unit that generates a control command based on the operation command for the axis from the interpolation unit;
a machining time predicting unit that predicts the machining time by calculating a time required for execution of the machining program; and
an axis operation simulation unit that simulates, based on the control command, the operation of the axis and calculates virtual responses of the operation of the axis by simulating feedback control with a servo control model and a plant model,
wherein the operation completion determination unit determines, based on the virtual responses, that the operation of the axis is complete,
wherein the machining time predicting unit calculates the time required for execution of the machining program from a command time of the machining program and a waiting time, the waiting time being obtained from the control command and completion of the operation of the axis.

2. The machining time predicting apparatus according to claim 1, wherein the axis operation simulation unit performs a simulation of an operation of a feed axis and a simulation of an operation of a spindle axis, the feed axis draws a path based on the machining program, and the spindle axis rotates a tool or a workpiece.

3. The machining time predicting apparatus according to claim 2, wherein the axis operation simulation unit operates to follow an operation of another axis, based on a virtual response of the other axis.

4. The machining time predicting apparatus according to claim 2, wherein the axis operation simulation unit performs the axis operation simulation of the feed axis or the spindle axis in a changeable manner in accordance with a command in the machining program.

5. The machining time predicting apparatus according to claim 1, further comprising a model setting unit capable of changing properties of the axis operation simulation unit,
the plant model including a numerical solution of one or more differential equations.

6. The machining time predicting apparatus according to claim 5, wherein the plant model includes an electric motor driven by an inverter functioning as a power source for the axis, the machining time predicting apparatus being capable of calculating a DC bus voltage to which the inverter is connected.

7. The machining time predicting apparatus according to claim 6, wherein the axis operation simulation unit comprises a plurality of the axis operation simulation units that are provided for two or more axes on a one-to-one basis, and the inverter of each axis operation simulation unit is connected to a same DC bus.

8. A machining time predicting method performed by a computer serving as a machining time predicting apparatus that predicts, based on a machining program, a machining time for a machine tool to machine a workpiece by controlling at least one axis, the method comprising executing:
a process of analyzing the machining program to generate an operation command of the axis;
a process of managing execution of the operation command, commanding the operation of the at least one axis based on a result of analyzing the machining program, and determining that the operation of the axis has been completed;
a process of generating a control command based on the operation command for the axis;
a process of predicting the machining time by calculating a time required for execution of the machining program; and
an axis operation simulation process of simulating, based on the control command, the operation of the axis and calculating virtual responses of the operation of the axis by simulating feedback control with a servo control model and a plant model, wherein the process of determining that the operation of the axis has been completed further includes determining, based on the virtual responses, that the operation of the axis is complete, wherein in the process of predicting the machining time, the time required for execution of the machining program is calculated from a command time of the machining program and a waiting time, the waiting time being obtained from the control command and completion of the operation of the axis.

\* \* \* \* \*